July 28, 1959     H. E. CHAPMAN     2,896,926
DEVICE FOR MIXING OR TREATING FLUIDS OR FREE-FLOWING POWDERS
Filed Nov. 20, 1956     8 Sheets-Sheet 1
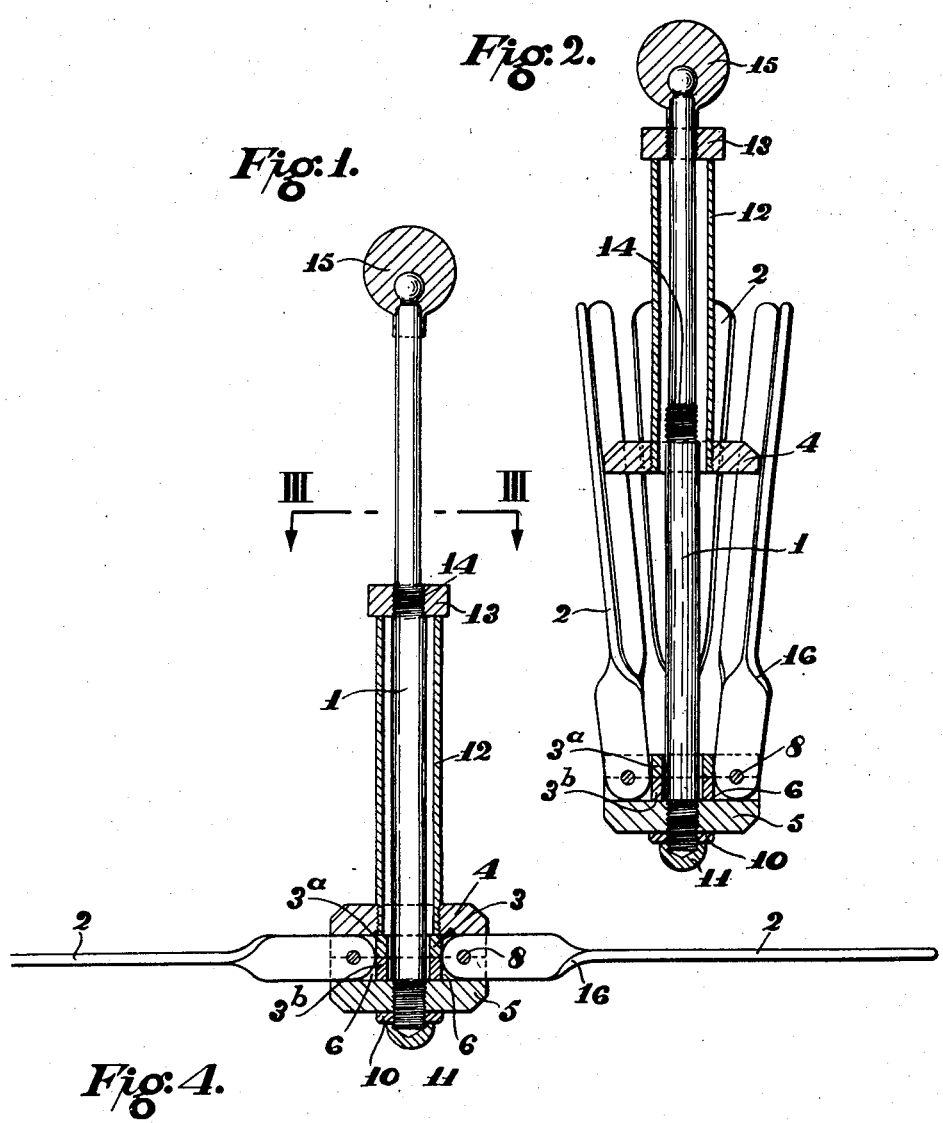
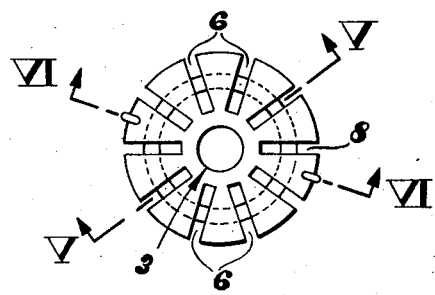
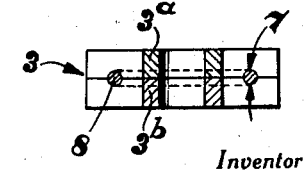
Inventor
HAROLD ERIC CHAPMAN
By
Richards & Geier
Attorneys July 28, 1959 H. E. CHAPMAN 2,896,926
DEVICE FOR MIXING OR TREATING FLUIDS OR FREE-FLOWING POWDERS
Filed Nov. 20, 1956 8 Sheets-Sheet 2
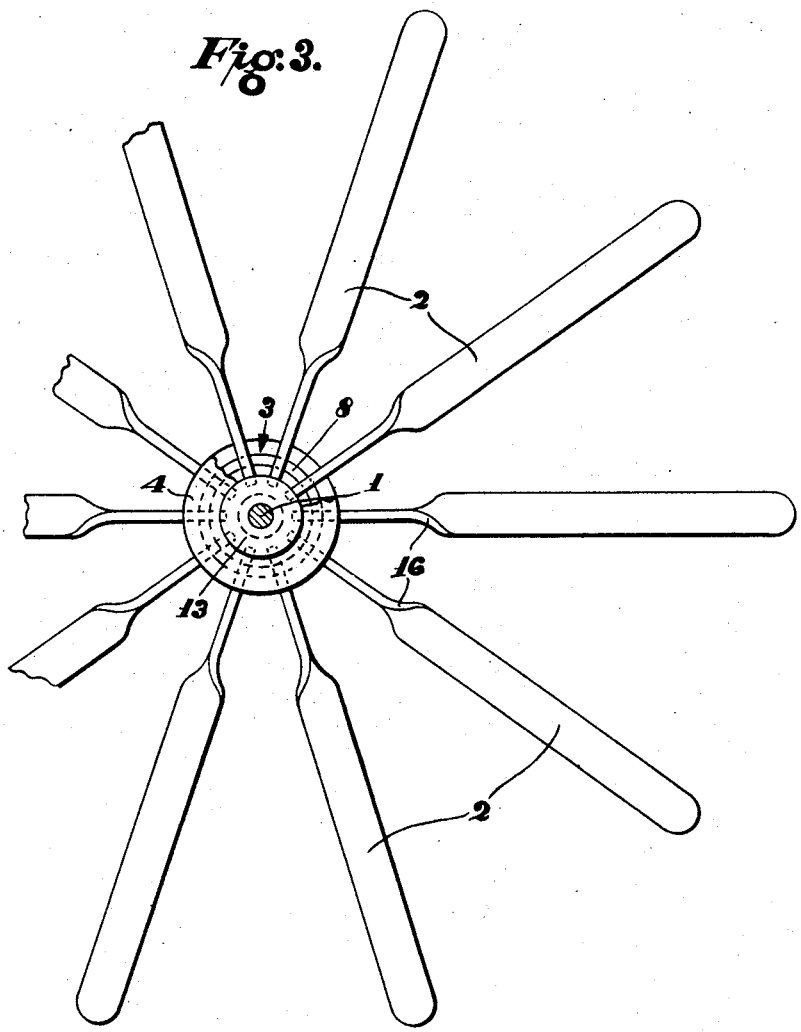
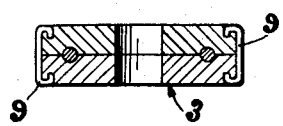
Inventor
HAROLD ERIC CHAPMAN
By
Richards & Geier
Attorneys

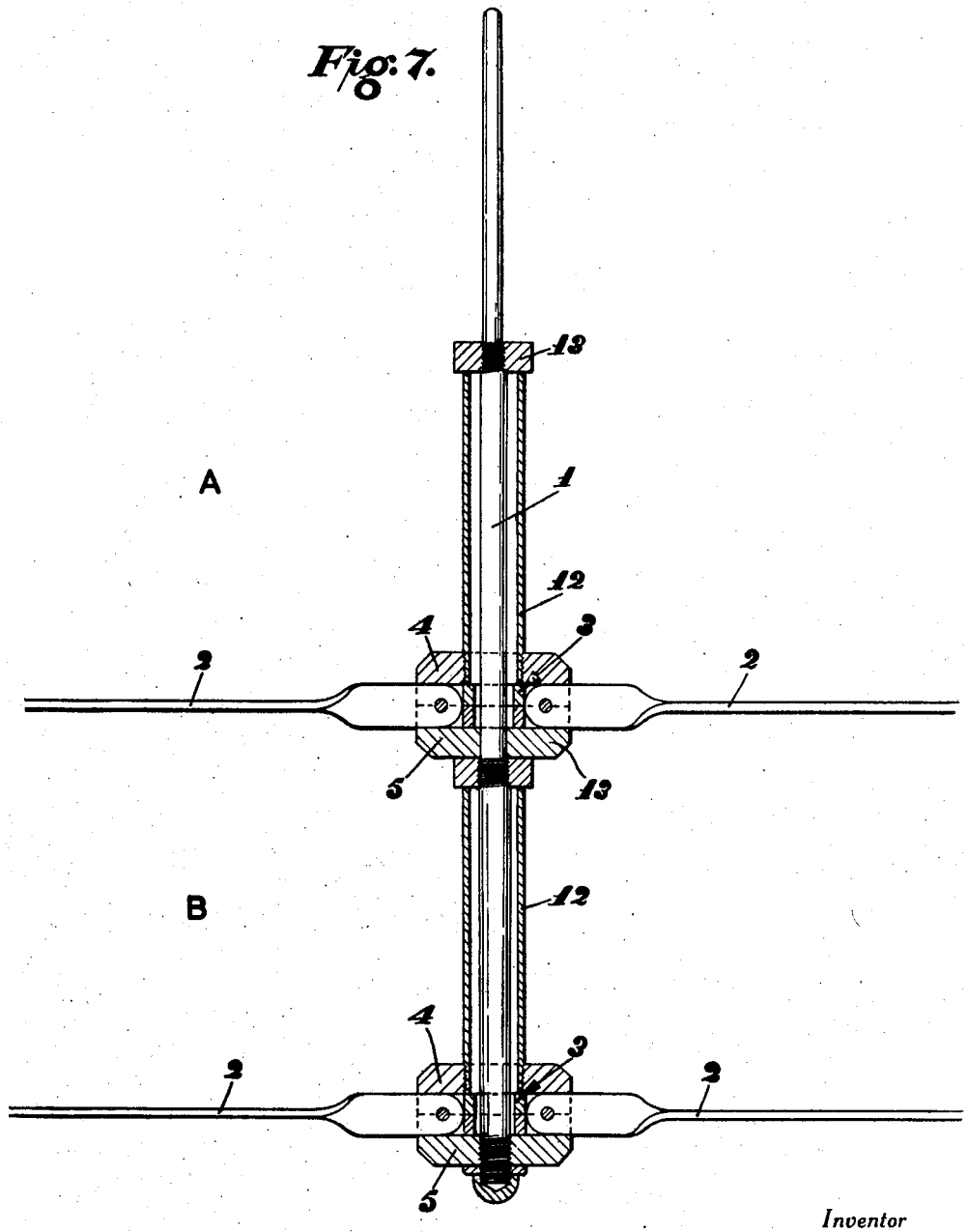

July 28, 1959 H. E. CHAPMAN 2,896,926
DEVICE FOR MIXING OR TREATING FLUIDS OR FREE-FLOWING POWDERS
Filed Nov. 20, 1956 8 Sheets-Sheet 4
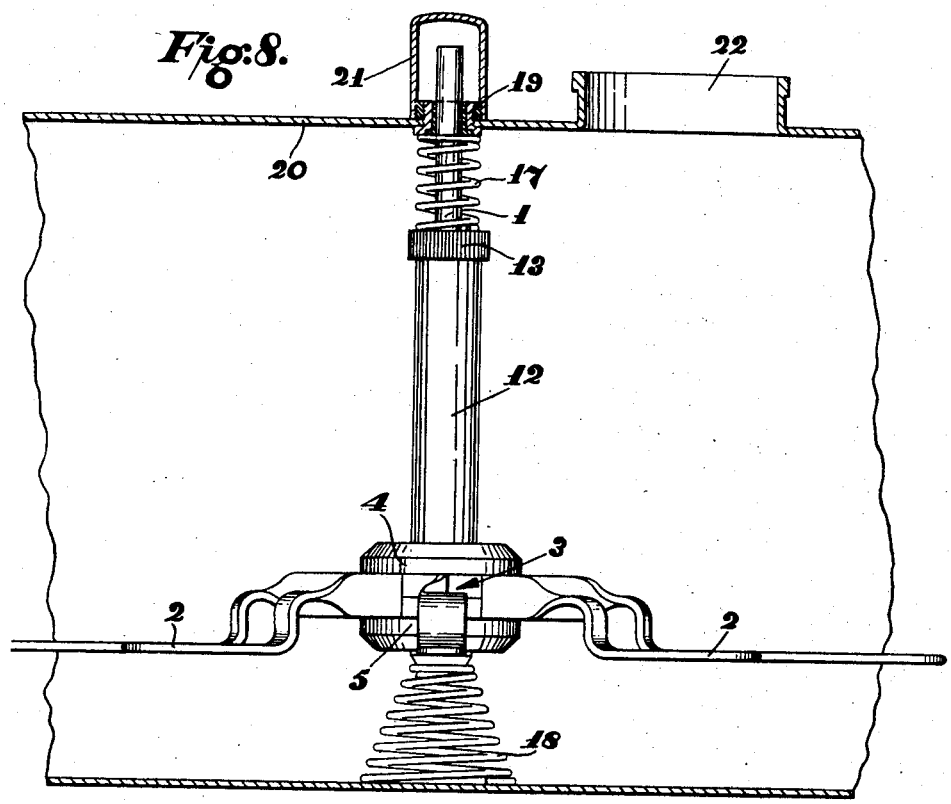
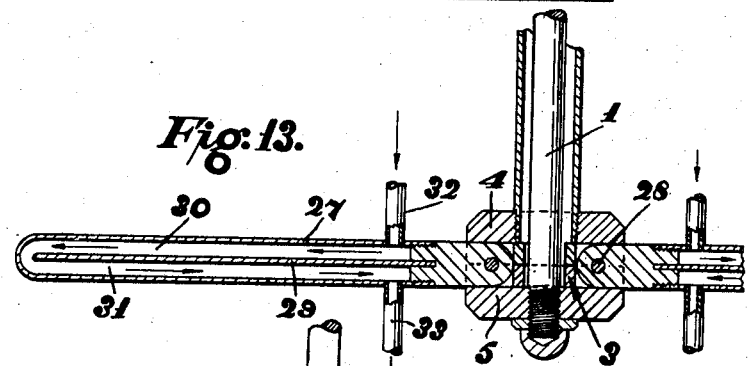
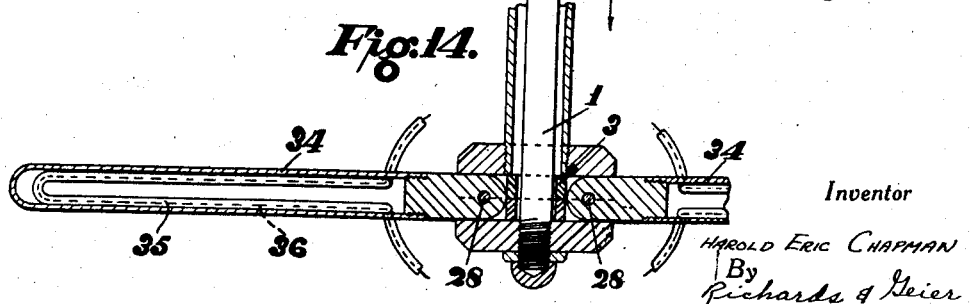
Inventor
HAROLD ERIC CHAPMAN
By
Richards & Geier
Attorneys July 28, 1959  H. E. CHAPMAN  2,896,926
DEVICE FOR MIXING OR TREATING FLUIDS OR FREE-FLOWING POWDERS
Filed Nov. 20, 1956  8 Sheets-Sheet 5

Inventor
HAROLD ERIC CHAPMAN
By
Richards & Geier
Attorneys

July 28, 1959  H. E. CHAPMAN  2,896,926
DEVICE FOR MIXING OR TREATING FLUIDS OR FREE-FLOWING POWDERS
Filed Nov. 20, 1956  8 Sheets-Sheet 6

Inventor
HAROLD ERIC CHAPMAN
By
Richards & Geier
Attorneys

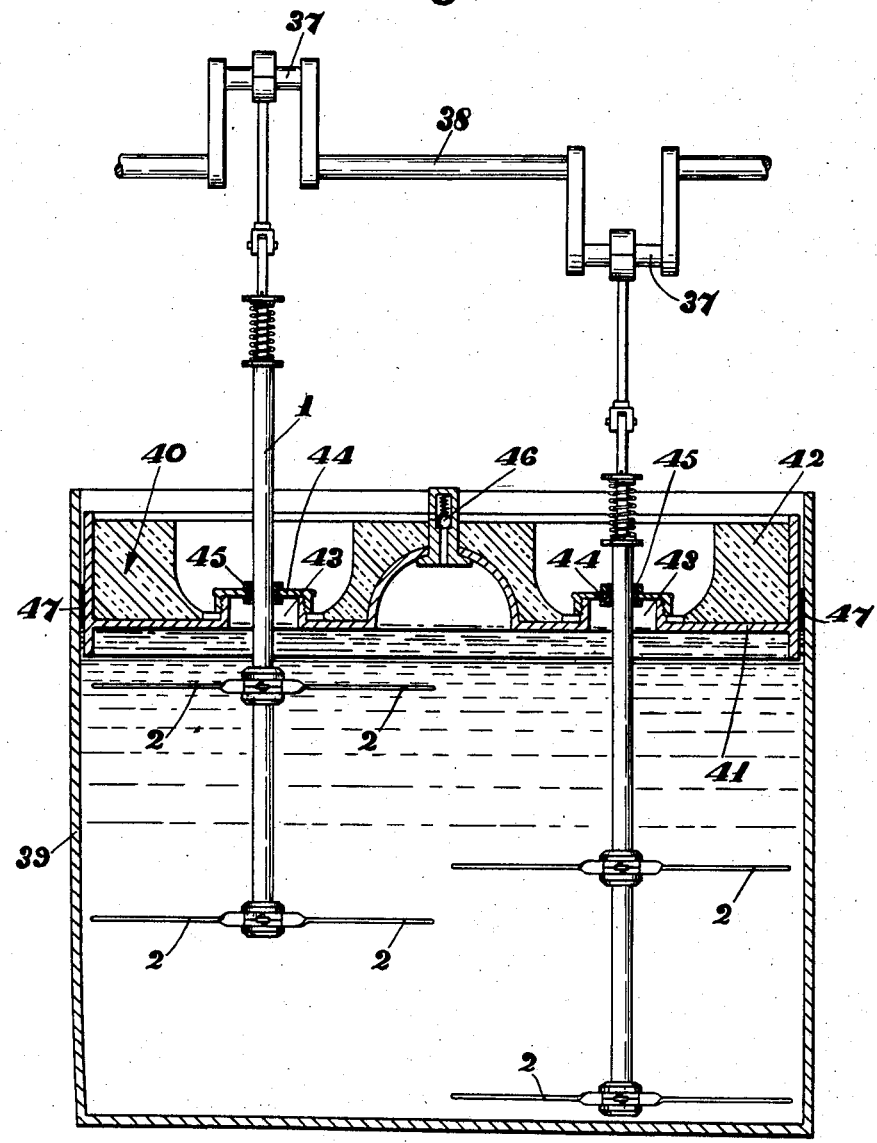

United States Patent Office 2,896,926
Patented July 28, 1959

2,896,926

DEVICE FOR MIXING OR TREATING FLUIDS OR FREE-FLOWING POWDERS

Harold Eric Chapman, Erdington, Birmingham, England

Application November 20, 1956, Serial No. 623,414

Claims priority, application Great Britain January 10, 1956

2 Claims. (Cl. 259—140)

This invention relates to devices for mixing or treating fluids or free-flowing powders, where the same are contained in bottles or other vessels having small or restricted apertures, and the object of the invention is to provide a device of an improved and novel construction which may be inserted through a small or restricted mouth or aperture of a bottle or other vessel containing fluids or powders and then caused to assume a form which enables the contents of the vessel to be blended or mixed in an efficient manner, and/or, where the contents consist of a fluid or fluids, heated or cooled according to requirements. The improved device may be used for the production of uniform solutions, mixtures, suspensions or dispersions, with or without simultaneous aeration, in containers of any capacity or shape and with, or without, heating or cooling; or the device may be used for heating or cooling fluids, particularly liquids, with, or without, mixing, or according to one embodiment of the invention, for extracting ferro-magnetic particles from liquids.

According to the invention, a device for mixing or treating fluids, or free-flowing powders, comprises a rod or other support carrying a plurality of radial or diverging arms or blades hinged or jointed to the rod or support, or to a part carried thereby, and adapted to be folded towards or against the rod or support, or towards its axis, for the purpose of enabling the device to be passed through a restricted aperture of a bottle or other vessel, the said arms or blades being adapted to be unfolded, or moved away from the rod or support, into extended positions for use, means being provided for releasably retaining the arms or blades in such extended positions. The rod or support carrying the arms or blades may be provided at one or each end with a coiled or other spring adapted when the device is inserted within a vessel to engage a wall or other part of the latter, so that when two springs are provided, one at each end of the said rod or support, the arms or blades may be floatingly supported between the two springs. The arms or blades, or some of the arms or blades, may be given a spiral, or part-spiral twist at, or near, their root ends, or at any other point or points, the twists being arranged so that any forces set up thereby tending to rotate the device when the latter is reciprocated counteract one another, and thus prevent any rotary movement of the device.

Also, according to the invention, a tank or other vessel for containing liquids, such as, for example, petrol and oil, is provided with a blending or mixing device comprising a rod or other support carrying a plurality of radial or diverging arms, the said rod or support being provided at one or at each end with a coiled or other spring engaging a wall or other part of the tank, so that the device is resiliently mounted upon the spring, or between the springs.

Further, according to the invention, a device for heating or cooling fluids comprises a rod or support carrying a plurality of radial or diverging arms or blades hinged or jointed to a rod or support, or to a part carried thereby, and adapted to be folded towards or against the rod or support, or towards its axis, for the purpose of enabling the device to be inserted through a restricted aperture of a bottle or other vessel, the said arms or blades being then adapted to be unfolded or extended, and means being provided for heating or cooling the said arms or blades.

Figure 1 of the accompanying drawings represents a vertical section through a blending or mixing device constructed in accordance with one embodiment of the invention, and having hinged or pivoted arms to enable the device to be inserted into a vessel having a restricted aperture, showing the arms extended for use.

Figure 2 shows a similar sectional view, illustrating how the arms may be folded to enable the device to be passed through a restricted aperture.

Figure 3 represents a section on the line III—III, Figure 1, with the upper arm-holding member and the hub broken away to show how the arms are hinged.

Figure 4 is a plan view, on a larger scale, of the hub part to which the arms are hinged.

Figure 5 is a section on the line V—V, Figure 4.

Figure 6 shows a section on the line VI—VI, Figure 4.

Figure 7 is a vertical section illustrating how two arm-carrying units may be mounted on a single rod or stem.

Figure 8 is a view showing how the device may be mounted between springs within a tank, such as a motor-cycle petrol tank.

Figure 13 shows how the arms may be constructed to enable a liquid in which they are immersed to be heated or cooled.

Figure 14 shows how the arms may be constructed for heating a liquid by electrical means.

Figure 15 illustrates another embodiment of the invention.

Figure 9:
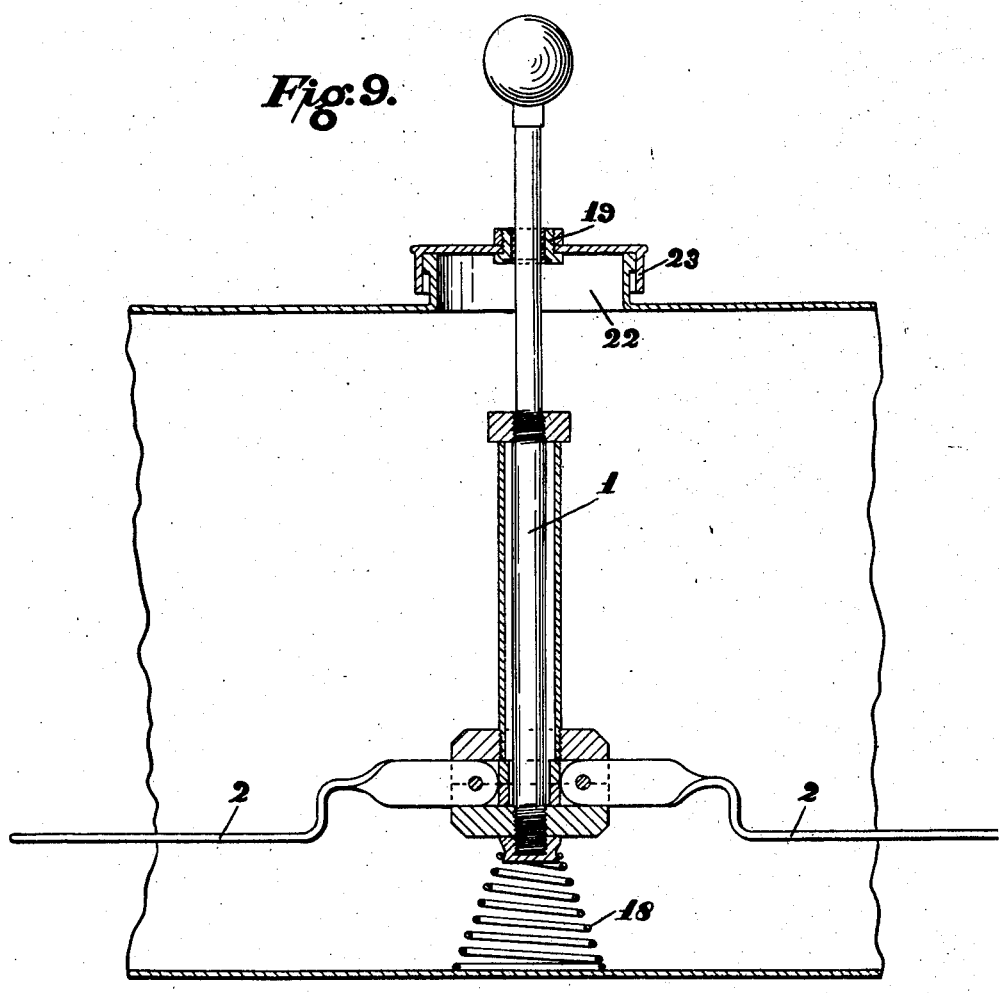
Figure 9 illustrates another arrangement suitable for use in a motor-cycle petrol tank.

Referring to Figures 1 to 6 of the drawings the improved fluid blending and mixing device is constructed so that it may be easily inserted through a restricted aperture, such as through the neck of a bottle or the filler opening of a tank or other vessel and then opened out to assume a form suitable for effecting an efficient blending or mixing of fluids, particularly liquids, contained within the vessel. The said device comprises a central rod 1 carrying a plurality of arms or blades 2 which extend radially from the rod 1. Any suitable number of arms or blades may be provided, ten being shown, by way of example, in the drawings, the said arms or blades being arranged at equal peripheral distances apart around the rod and being each hinged to a central hub 3 which is threaded on to the rod 1 and is disposed between a pair of disc-like retaining members or plates 4 and 5. The hub 3 consists of two superimposed metal discs 3a and 3b identical in form and each having a plurality of equally-spaced coinciding radial slots 6 adapted to receive the inner root ends of the arms or blades 2. Formed in the opposed inner faces of the discs 3a and 3b is an annular groove 7, the two grooves coming together to form an annular housing for a wire ring 8, which extends across the slots as shown in Figure 4, the exposed portions of the ring serving as pivots for the radial arms 2 and engaging holes in their inner ends. The arms 2 are thus all pivoted by the ring to the central two-part hub 3, so that they are spaced at equal distances apart by the latter, and the construction is such that, when not retained by the plates 4 and 5, they may be turned within the slots 6 about the wire ring 8 through an angle of approximately 180°, that is either upwardly or downwardly from horizontal positions through an angle of about 90°.

After the wire ring 8 has been passed through the holes provided in the inner ends of the arms 1 and the two parts 3a and 3b of the hub have been applied together, the said parts of the hub are secured by clips 9 (Figure 6) which are sprung into grooves in the two parts; or the latter may be secured together by other means. The hub 3, with the arms 2 hinged thereto, is then threaded down over the rod 1 from its upper end until it rests upon the lower retaining plate 5, the latter having been screwed on to the lower end of the rod 1, as shown in Figure 1. A lock-nut 10 carrying a plastic or rubber buffer 11 is screwed on to the lower extremity of the rod 1, as shown. The upper retaining member 4 is screwed on to the lower end of a tube or sleeve 12 of an interior diameter larger than the diameter of the rod 1, or the member 4 may be otherwise fixed to the tube. After the hub 3, with the arms 2, has been threaded over the rod 1, as described, the tube 12 carrying the member 4 is passed down over the rod until the member 4 engages, or lies close to, the inner ends of the arms 2, the tube 12 being then secured against end movement by a nut 13 which is screwed on to a threaded part 14 of the rod. The arms 2 are now held between the retaining members or plates 4 and 5 so that they all extend horizontally from the rod 1 in the manner shown in Figures 1 and 3, the device being then ready for use. The upper end of the rod 1 may be fitted, if desired, with any suitable knob or handle, such as a knob 15.

Before the blending or mixing device can be inserted into a bottle, tank or other vessel, through a restricted orifice, such as through the mouth of a bottle, the nut 13 is unscrewed and the tube 12, with the upper plate or arm-retaining member 4, is slid up as far as possible along the rod 1 which may be of any desired length, after which the arms 1 are folded up in the manner illustrated in Figure 2, so that they lie alongside, and more or less parallel to, the rod 1. The arm 1, and all the parts of the device, now lie within a small diameter circle, so that the whole device may be easily inserted down through the neck of a bottle, or through the filling aperture of a tank. After the device has been inserted, in this way, into a bottle or other vessel the tube or sleeve 12 is moved down the rod 1, so that the retaining member or plate 4 causes the arms 1 to spread outwards and to fall down into horizontal positions, the arms being held in these positions by screwing the nut 13 on to the rod, so that the member 4 is held close to the inner ends of the arms, as shown in Figure 1. The device may now be reciprocated manually in a vertical direction by the knob or handle 15, which remains outside the vessel, and during this movement the arms 1, arranged as shown, agitate the liquids and effect an efficient blending or mixing of the same. To enable the device to be withdrawn after use, the nut 13 is unscrewed and the tube, with the plate 4, moved to the upper part of the rod. The hub 3 is then drawn upwards on the rod causing the arms 2 now to swing downwards from their horizontal positions to lie alongside the lower part of the rod into positions which are the inverse of those shown in Figure 2, thereby allowing the device to be easily removed from the vessel. The hub 3 may carry a loop (not shown) with which the hook-end of a piece of wire may be engaged so that the hub may be easily drawn up over the rod 1 to allow the arms to swing downwards.

The arms 2 may be of a narrow strip formation, and may be given a part-helical twist 16 near their inner or root ends so that their main outer portions lie in a horizontal plane when the arms are extended for use, to form efficient agitating blades, whilst their inner ends lie in vertical planes to fit into the slots in the hub 3. The root ends of the arms are at the same time strengthened. Some of the arms are twisted in one direction and some in the opposite direction so that when the device is reciprocated they set up opposing forces which counteract one another and prevent the device from rotating and tending to rotate. By preventing rotation of the device maximum turbulence is ensured during blending or mixing for a given input of energy. In the construction shown each arm is twisted in a direction opposite to that of the next adjacent arm.

Each arm may have more than one twist, if desired, and the arms may be of any desired length and/or width, and may be of any other suitable shape. The device may be reciprocated either manually, or by mechanical or electrical means, such as by an electric motor, and the central rod may pass through a gland or stuffing box in a cap or closure fitted over the aperture through which the device is passed. The aperture, especially in the case of a bottle, may be fitted with a closure of a flanged hollow inverted conical construction, the end of the inverted cone being cut off at a suitable place to provide a hole of a suitable diameter to receive the rod.

If desired, a plurality of blending or mixing devices may be threaded on to a common central rod, and such an arrangement is shown in Figure 7 of the drawings. Referring to this figure the central rod 1, which may be of any desired length, is fitted with two separate but identical blending or mixing units A and B each comprising a plurality of radial blades or arms 2 hinged to a central hub 3 disposed between a pair of clamping or retaining plates 4 and 5 arranged exactly as in the previously described construction, the upper retaining plate 4, in each case, being attached to a tube or sleeve 12 held in place by a nut 13 which secures the assembly in place with the arms 2 extended for use. The arms 2 of each unit may be folded against the rod 1 and withdrawn with the latter from the vessel after removing the nuts 13. The rod 1 may be longer and more than two arm assembly units may be threaded on to the same.

Figure 8 of the drawings shows a blending or mixing device of substantially the same construction already described but mounted between springs and housed within the tank of a motor-cycle, where oil is mixed with the petrol, such as is usual for two-stroke engines. Thus, referring to this figure, the device housed within a tank 20 comprises radial arms or blades 2 hinged to a central hub 3 disposed on a central rod 1 between clamping or retaining plates 4 and 5, the arms being held in their extended positions for use by a tube 12 and nut 13 as in previous constructions, but the whole device is floatingly mounted between upper and lower coiled springs 17 and 18 which engage respectively the top and bottom walls of the tank. The arms 2 may be cranked downwards, as shown, so that they may more effectively disturb any oil on the bottom of the tank when the device is reciprocated. The lower spring 18 is attached to the lower end of the rod 1, being anchored, for example, in a groove around the latter, whilst the upper spring 17 is mounted between the nut 13 and the top wall of the tank 20. The rod 1 is arranged to pass through a gland or seal in the top wall and the upper end of the rod may be covered by a removable screw-cap 21 shaped to allow of an axial movement of the rod. The gland may comprise a tube 19 of nylon or other material having a low co-efficient of friction. The device may be inserted into position, after the blades 2 have been folded, by passing it down through the usual filler aperture 22 of the tank. When the motor-cycle is in motion the movement of the vehicle causes the radial arms 2 to move up and down within the tank owing to the springs 17 and 18 and effect an efficient mixing or blending of the petrol and oil. If the cap 21 is removed the rod 1, with the blades, may be reciprocated by hand before starting the vehicle, so as to mix the petrol and oil, since the oil normally tends to separate and to settle on the bottom of the tank.

Figure 9 shows a slight modification of the arrangement illustrated in Figure 8. In the Figure 9 arrangement there is provided a similar blending or mixing device with a central rod 1 carrying arms or blades 2 hinged so that they may be folded and the device may be inserted through the filler aperture 22, but the device, in this case, is supported by a single spring 18 attached to the lower end of the rod 1, and the latter is arranged to pass through an aperture in the filler cap 23, a gland with a nylon or other anti-friction tube 19, surrounding the rod 1 to give a close sliding fit. A suitable air vent (not shown) may be provided in the gland, if desired.

In any case, where the rod of the blending or mixing device passes through an aperture in a wall of a tank or vessel, or in a cap or closure, any suitable gland or stuffing box may be provided, and a stuffing box packed with "fluon" or similar material having a low co-efficient of friction may be provided.

Figure 10:
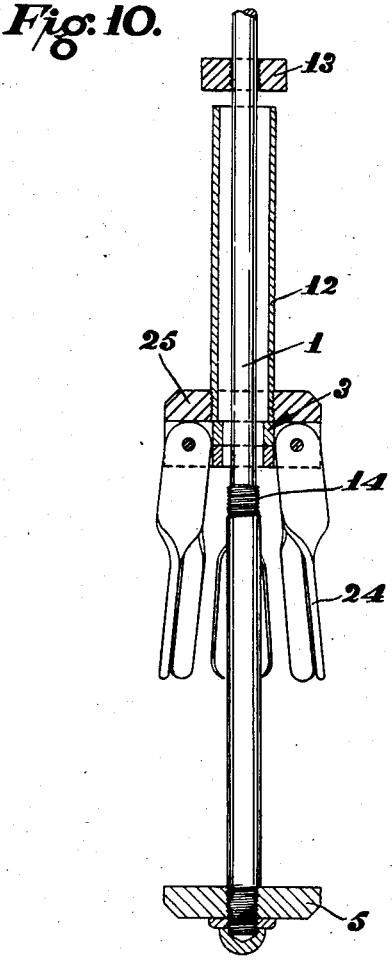
Figure 10 shows, in vertical section, a modified form of agitating device, in which the arms fold downwards only.

The modified form of blending or mixing device illustrated in Figure 10 of the accompanying drawings comprises a plurality of arms or blades 24 hinged to a hub 3 which is mounted on a central rod 1, but the hub, which may be in two parts as previously described, is fixed, such as by screws, to an upper plate or disc 25 carried by the tube 12, so that when the latter is moved up over the rod the hub and arms move with it. A lower clamping plate or disc 5 is fixed on the lower end of the rod 1. When the sleeve 12 is moved down the latter until the hub 3 engages the plate or disc 5 the arms or blades 24 are caused automatically to unfold and assume more or less horizontal positions, being then held in these positions by the nut 13 engaging the threaded part 14 of the rod. To insert the device through a restricted opening of a bottle or other vessel, or to remove it therefrom, the sleeve 12, with the hub and arms, is moved towards the upper end of the central rod 1, after the removal of the nut 13, when the arms or blades 24 hang down in the manner illustrated. The arms or blades are shorter than in the previous examples, but they may obviously be of any suitable length.

Figure 11:
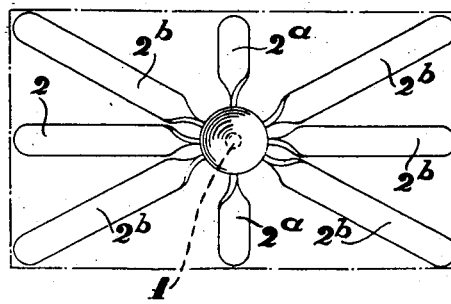
Figure 11 illustrates how the lengths of the arms may be adapted for use in a tank of a rectangular shape in plan.

The arms or blades of the same device may be of different lengths according to the plan shape of the vessel or tank, so that a proper blending or mixing of the liquids in all parts of the vessel or tank may be obtained. Thus for a rectangular tank arms of the relative lengths shown diametrically in Figure 11 may, for example, be provided, the central rod 1 carrying relatively short hinged blades 2 and 2a which extend at right-angles to the end and side walls of the tank respectively and longer hinged blades 2b which extend up to the corners of the tank, the latter being represented in plan by the broken lines 24. The mixing or blending is effected, as before, by reciprocating the device.

Whilst the devices illustrated are intended for reciprocation in vertical planes this is not essential, and the rod carrying the blades may be arranged horizontally, or at any other suitable angle, the said rod being arranged to pass through a suitable fluid or liquid tight gland in a wall of the vessel.

When the device is intended to be used for mixing free flowing powders, such, for example, as talc, soapstone, boric acid or starch powder, the hinged blades may have sharp lower edges which are capable of cutting through the powders. Such blades may, for example, be of wedge cross-sectional shapes, with the sharp lower edges, so that they cut through the powders during the downward movement, whilst during their upward movement their broad upper faces serve efficiently to agitate and mix the material.

Figure 12:
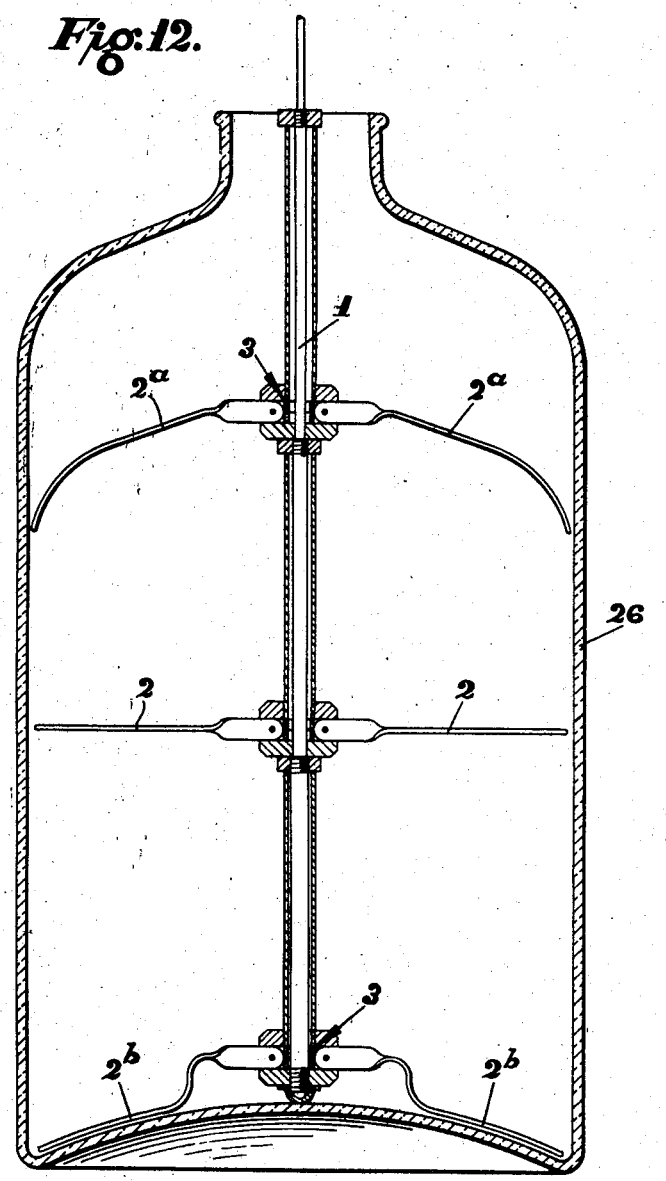
Figure 12 illustrates a further embodiment of the invention, showing how the arms may be shaped to conform with the shapes of the upper and base parts of a bottle.

Not only may the arms or blades be of different lengths to suit the plan shape of the vessel or tank for which they are intended, but they may be curved or shaped to conform to the cross-sectional shape of the top and bottom of the tank or vessel. Figure 12 of the drawings shows how the arms may be adapted in this manner for use in a bottle of a particular shape. Referring to this figure a bottle 26 having a curved base and a curved upper portion is provided with a mixing or blending device comprising an upper set of downwardly-curved hinged arms 2a radiating from a central hub 3 and conforming to the shape of the upper end of the bottle, and a lower set of hinged arms radiating from a hub 3 and conforming with the shape of the bottom of the bottle. In addition, a set of hinged radiating horizontal arms 2 may, or may not, be provided. The arms of each set may be secured in their extended position for use by the means previously described, or if desired by other means, all of the arms being arranged to fold, when released, to lie alongside the central rod 1 so that the device may then be easily inserted through, or withdrawn through, the neck of the bottle. This construction enables the contents of the bottle to be adequately blended or mixed, the lower arms serving to disturb and agitate any sediment which might otherwise settle in the corners at the bottom.

If, in the devices described, the arms, or some of the arms, are moved up during reciprocation of the device above the top of liquid in a bottle or vessel they can be used to aerate the liquid.

In the case of vessels where the contents which are to be blended or mixed include particles liable to form a sediment at the bottom of the vessel the arms, or the lower arms, where more than one set of arms is provided, may be serrated, provided with claws, or otherwise formed, to break up or disturb the sediment.

According to another embodiment of the invention the arms may be so hinged and arranged so that they are prevented from being moved up beyond their horizontal or extended positions for use when the central rod or part by which they are carried is moved downwards through the contents of the vessel to agitate the contents, but so that they are free to yield or to move downwards at each upward stroke of the device, so they then offer a less resistance to movement.

The arms may be hingedly connected to a central part or hub of any other construction by any suitable means, either by a flexible connection or by a positive pivotal connection.

In some cases, such as for mixing free flowing powders, the arms may be set edgewise in vertical planes, or some of the arms may be set edgewise in a vertical plane and others, such as alternate arms, set flat in a horizontal plane, the particular arrangement being selected according to the viscosity of the liquids to be mixed or blended. Also, if desired, some or all of the arms may be perforated to reduce resistance and increase turbulence; or the arms may be of a corrugated or wave-like form either throughout their length, or at their ends only.

According to a further embodiment the arms of the improved mixing or blending device may be connected together by webs, which may, or may not, be apertured or perforated.

Whilst the devices described have all been intended for blending or mixing fluids, the devices suitably modified may be used, if desired, for heating or cooling liquids, still embodying the provision of hinged arms which is the essential feature of the invention.

Figure 13 is an example of how the device may be adapted for either heating or for cooling liquids. The device in this case, comprises a plurality of arms 27 hinged at 28 to a central boss 3 mounted on a rod 1 and held in extended positions for use by upper and lower clamping plates 4 and 5, so that the arms may be folded to lie alongside the rod 1, to enable the device to be passed through a restricted aperture as previously described. The arms 27, however, are hollow or tubular, each arm being divided by a division 29 into passages 30 and 31 in communication with one another at the outer ends of the arms, and in order to heat the liquid in which the arms are immersed a hot fluid, for example hot water, or steam, is passed through a flexible inlet tube 32 into the passage 30 and flows back from the latter through the passage 31 and out through a flexible outlet tube 33. All of the arms may be heated in the same way, and the device may also, if desired, be reciprocated where two liquids are to be heated and at the same time mixed or blended; or where cooling is desired a cold fluid may be circulated through the arms.

Figure 14 shows another arrangement which may be used for heating liquids, as well as for blending or mixing the same, if desired. In this construction a plurality of hollow radial or diverging arms 34 are hinged at 28 to a central hub 3 carried by a rod 1, so that they may be folded alongside the latter to pass through a restricted aperture in the same way, and in each hollow arm is arranged a tubular sheath 35 containing an insulated electrical conductor 36. By passing an electric current through the arms the latter, and the liquid or liquids within which the device is immersed, may be heated as desired, and liquids may, if desired, at the same time be blended or mixed by reciprocating the device.

Where provision is made for heating the arms, a plurality of sets of hinged radial arms may be provided, the sets being superimposed, and vertically spaced apart and the arms of each upper set being shorter than the arms of the next adjacent lower set, giving, in effect, a substantially conical structure. The arrangement may be such that, in use, convection currents of a toroidal form are set up in the liquid which ensure a rapid heating of the entire bulk of the liquid in the container.

According to a further embodiment of the invention each arm or blade 2 of the device, or some of the arms or blades, may be provided with magnets so that after the device has been inserted into a vessel and the arms unfolded the magnets may serve to abstract ferro-magnetic particles from the liquid, or from sediment in the vessel. Instead of, or in addition to, magnets on the arms, a magnet may be carried by the lower end of the central rod. If desired the liquid may be fed from the bottom to the top of the vessel, and the magnets may be protected by suitable means from corrosion.

Again the arms may be hollow or tubular and may be perforated, provision being made for forcing a gas through the arms and out through the perforations for the purpose of enabling a liquid to be saturated with the gas.

In the embodiment of the invention illustrated in Figure 15 of the drawings, a pair of mixing or blending devices are shown in a tank 39 adapted for treating liquids under ideal conditions where air has to be excluded, for example for the mass treatment of fermented liquids in brewing and the like, or for the treatment of sewage, so that an aerobic fermentation may take place. The two mixing devices each comprise a central rod 1 carrying two sets of radial arms 2 hinged to central hubs in the manner above described so that they may be folded towards the central rod and the complete device inserted through a restricted aperture. The two devices are shown connected to cranks 37 on an overhead shaft 38, so that the two devices may be reciprocated vertically through the liquid in the tank, the one device being at the top of its stroke when the other is at the bottom; or the two mixing devices may be reciprocated by other mechanical means, or, if desired, by hand. Also, the arms, with or without magnets, may be constructed so that they may be heated or cooled, such as in the manner previously described, according to the treatment required for the liquid in the tank 39. To exclude the air the latter is provided with a floating cover 40 comprising a pan 41 of a light metallic alloy faced with a chemically inert material, such as with a suitable plastic. The plastic upper covering 42 may be of a considerable thickness, as shown, so as to add strength to the cover and may be of such a nature that it does not materially increase the weight of the cover. The latter is provided with a pair of restricted apertures 43 through which the mixing or blending devices may be inserted after the arms 2 have been folded, each aperture being closed by a cap 44 fitted with a gland 45 through which the central rod of the respective mixing device passes. A safety valve 46 is provided. The floating cover 40 fits close up to the walls of the tank with only a slight clearance to permit of the free movement of the cover, this clearance being closed by an oil seal 47, or by an inflatable tube engaging grooves in the wall of the cover. The tank may be rectangular or circular in plan, and may contain any desired number of reciprocable mixing or blending devices.

The mixing devices described may be made from any suitable material, and where necessary may be made from a chemically inert plastic material, or from a suitably coated metal or alloy.

I claim:

1. A liquid mixing device comprising a central rod, a hub on the rod, blades hinged to, and peripherally spaced around the hub, means below the hub for supporting the blades in extended positions in a plane substantially at right-angles to the axis of the rod, an upper clamping member above the hub for engaging the inner ends of the blades for fixing them in their extended positions, a tube on the rod engaging the upper clamping member and a nut engaging a screwed portion of the rod for releasably securing the tube and the upper clamping member against axial movement.

2. A reciprocatable mixing device comprising a rod with a screwthreaded part, a non-slidable clamping member on the rod, a clamping member slidable on the rod, a hub on the rod between the two clamping members, at least three radial blades hinged to the hub and equally spaced around the latter, a tube slidable on the rod and attached to the slidable clamping member moving the latter along the rod towards the hub and the non-slidable clamping member so that the two clamping members engage with the inner ends of the blades and positively retain the latter in extended positions for use, the said tube also enabling the slidable clamping member to be moved along the rod into a position away from the hub to permit of the blades being folded to lie alongside the latter, and a nut engaging the screwthreaded part of the rod adapted to engage an end of the tube to prevent axial displacement of the tube when the blades are extended for use.

References Cited in the file of this patent

UNITED STATES PATENTS

| | | |
|---|---|---|
| 609,270 | Flaherty | Aug. 16, 1898 |
| 697,579 | Wehmeier et al. | Apr. 15, 1902 |
| 990,546 | Gross | Apr. 25, 1911 |
| 1,692,270 | Jensen | Nov. 20, 1928 |
| 1,768,012 | Stone et al. | June 24, 1930 |
| 1,827,004 | Gibson | Oct. 13, 1931 |
| 1,962,803 | Bruins | June 12, 1934 |